(12) United States Patent
Atkin et al.

(10) Patent No.: US 7,496,544 B2
(45) Date of Patent: Feb. 24, 2009

(54) METHOD AND APPARATUS FOR ASSESSING PRODUCTS

(75) Inventors: Steven Edward Atkin, Austin, TX (US); Mark Edward Davis, Menlo Park, CA (US); Michael Francis Moriarty, Byron, MN (US); Dale Martin Schultz, Chelmsford, MA (US); William James Sullivan, Bethel, CT (US); Luis Zapata, Wake Forest, NC (US)

(73) Assignee: International Business Machines Corporation, Armonk, NY (US)

( * ) Notice: Subject to any disclaimer, the term of this patent is extended or adjusted under 35 U.S.C. 154(b) by 628 days.

(21) Appl. No.: 11/109,070

(22) Filed: Apr. 19, 2005

(65) Prior Publication Data

US 2006/0235708 A1 Oct. 19, 2006

(51) Int. Cl.
*G06F 17/60* (2006.01)

(52) U.S. Cl. ............................. 705/400; 705/1; 717/136; 717/137; 706/925

(58) Field of Classification Search ................. 705/400, 705/7, 10; 717/136, 137, 115; 707/4
See application file for complete search history.

(56) References Cited

U.S. PATENT DOCUMENTS

| | | | |
|---|---|---|---|
| 5,274,801 A | 12/1993 | Gordon et al. | |
| 5,664,206 A * | 9/1997 | Murow et al. ................. | 704/8 |
| 5,671,351 A | 9/1997 | Wild et al. | |
| 5,678,039 A * | 10/1997 | Hinks et al. ................... | 707/4 |
| 5,758,061 A | 5/1998 | Plum | |
| 6,163,805 A | 12/2000 | Silva et al. | |
| 6,219,654 B1 * | 4/2001 | Ruffin ......................... | 705/400 |
| 6,381,604 B1 | 4/2002 | Caughran et al. | |
| 6,557,120 B1 * | 4/2003 | Nicholson et al. .............. | 714/38 |
| 6,826,745 B2 * | 11/2004 | Coker et al. ................. | 717/115 |
| 6,996,805 B2 | 2/2006 | Achlioptas et al. | |
| 7,103,875 B1 * | 9/2006 | Kaneko et al. ............... | 717/125 |
| 7,113,904 B2 * | 9/2006 | Litster et al. ................... | 704/8 |
| 7,143,391 B1 | 11/2006 | Guo | |
| 7,240,019 B2 * | 7/2007 | Delurgio et al. ............... | 705/10 |
| 2002/0095391 A1 * | 7/2002 | Swart et al. ................. | 705/400 |

(Continued)

OTHER PUBLICATIONS www.romanian-translations.ro/prices.html, Prices and Free Cost Estimate for your Romanian Translation and Localization Projects.*

(Continued)

*Primary Examiner*—John W Hayes
*Assistant Examiner*—Brian Epstein
(74) *Attorney, Agent, or Firm*—Duke W. Yee; Diana L. Roberts-Gerhardt; Lisa L. B. Yociss (57) ABSTRACT

An improved method, apparatus, and computer instructions for evaluating acquisition costs for a software product. A set of questions regarding the software product is presented. The set of questions are selected from a source. Costs for acquiring the software product are identified in response to receiving a user input to the set of questions. A report is generated using the costs, wherein the report is used to evaluate whether to acquire the software product in response to identifying the costs.

1 Claim, 5 Drawing Sheets

U.S. PATENT DOCUMENTS

| | | | | |
|---|---|---|---|---|
| 2002/0165834 | A1* | 11/2002 | Delurgio et al. | 705/400 |
| 2003/0041095 | A1* | 2/2003 | Konda et al. | 709/201 |
| 2003/0046059 | A1* | 3/2003 | Litster et al. | 704/8 |
| 2003/0120477 | A1* | 6/2003 | Kruk et al. | 704/2 |
| 2003/0192040 | A1* | 10/2003 | Vaughan | 717/173 |
| 2003/0233249 | A1* | 12/2003 | Walsh et al. | 705/1 |
| 2004/0128263 | A1* | 7/2004 | Dosanjh | 705/400 |
| 2005/0071286 | A1* | 3/2005 | Laicher et al. | 705/400 |
| 2006/0190417 | A1* | 8/2006 | Hilkemeyer et al. | 705/400 |

OTHER PUBLICATIONS

Software Localization for Internet Software: Issues and methods, Roassn Web Collins, IEEE Software Mar./Apr. 2002.*

Demystifying Software Globalization, Kenneth McKethan, Jr. and Graciela White, www.accurapid.com/journal/32global.html, Mar. 19, 2005.*

Free/Open Source Software: Localization, Anousak Souphavanh and theppital Karoonboonyanan, Sep. 9, 2005.*

U.S. Appl. No. 10/902,476, Atkin et al, Method and Apparatus for Testing Software, Jul. 29, 2004.

* cited by examiner

Q: Do you create separate versions for each country? A: Yes — 700

Non-converged single source tree (Impact: High Cost)

Confirm that the product development team uses a single source tree to build all — 702
language versions of the product. See this link. — 708

Multiple maintenance deliverables (Impact: High Cost)

Determine if the product team is capable of delivering maintenance on all versions. — 704
See this link. — 710

Inadequate Separation of translatable text (Impact: Medium Cost)

Investigate whether translatable text can be easily extracted from the multiple source — 706
trees. See this link. — 712

Do you currently do business in Asia? (yes) ⟋ 600

Which countries? (Japan only) ⟋ 602

Do you translate any of your products into Japanese or offer them in English only? (translate) ⟋ 604

Is your translatable information kept separate from "live" code or is it inline? (inline) ⟋ 606

How many lines of translatable material was in your most recent Japanese release? (15,000) ⟍ 608

Do you allow the entry of Japanese characters? (yes) ⟍ 610

What sort of character encoding do you use? (ex Unicode or Shift-JIS)? (Shift JIS) ⟍ 612

*FIG. 6*

Globalization Questions for Suppliers:  *FIG. 8*

800 — Q1. Is your product designed for Global use (Globalization)?
(If answer is "yes" to above question - then ask other questions)

Definition of Globalization -- making a company's applications work seamlessly regardless of the user's language, culture and business conventions
  It is a critical factor for creating a successful e-business. Multinational companies can extend their new Web-based business models to a global market if they understand all the technologies and products involved and develop a strategy for effective globalization.
  If it is a server based product, it must be able to support multiple locales (language/country) simultaneously from the same executable (i.e. it is not acceptable to have one version that supports only Chinese in China, and another one that supports only Japanese in Japan and then use a front end server to direct the browser based on user preferences).

802 — Q2. As far as your understanding - what globalization features are in your product?
(Just to get the idea of how much the supplier knows about globalization in general.)

804 — Q3. Which language/country character sets does your product support besides English?
(give examples: see question 7).

806 — Q4. Does your product support Unicode? If so,
- Which version of Unicode?
- Do you use a standard library for functions such as codepage conversion or collation? If so, which one (e.g. International Components for Unicode, Rosette from Basis Technology, Java Runtime)?

808 — Q54. Into which languages is your product translated:
- Product user interface translation into?
- Product documentation translation?

810 — Q65. Is your translated product available globally?
- Are the translated versions available at the same time as the original version? Do you support Worldwide simultaneous General Availability for all translations?
- 
- Can customers obtain your product translations anywhere in the world?
(At this point if it looks like supplier has a good understanding of Globalization requirements then ask one more following detailed question)

812 — Q76. Does your product have "basic support" for all language/country pairs identified in the attached list? If "no" then when is it going to be available?
  Definition of "basic support":
- Support for a language/country's character sets, code pages, and input/output interfaces
- Support Unicode
- Support simple text languages (German or any western European languages)
- Support complex text languages (including Bidirectional languages, Indic, Thai, and Vietnamese)
- Support ideographic languages (Chinese, Japanese, Korean)
- Support cultural formats (time, date, number formatting, monetary, collation, searching, Euro, etc)
- Support language and cultural selectability - can switch language/cultural settings 814 — Q8. Does your product support any linguistic tools? If so, which ones (e.g. spell checker, thesaurus.)

Reference for supplier:
IBM Globalization external Web site for supplier: "Globalizing your e-business"
http://www-306.ibm.com/software/globalization/index.jsp

FIG. 9

METHOD AND APPARATUS FOR ASSESSING PRODUCTS

CROSS REFERENCE TO RELATED APPLICATION

The present invention is related to an application entitled: Method And Apparatus For Testing Software, Ser. No. 10/902,476, filed Jul. 29, 2004, assigned to the same assignee, and incorporated herein by reference.

BACKGROUND OF THE INVENTION

1. Technical Field

The present invention relates generally to an improved data processing system and in particular to a method and apparatus for processing data. Still more particularly, the present invention relates to a method, apparatus, and computer instructions for evaluating software.

2. Description of Related Art

When analyzing a company as a prospective target for partnership or acquisition, it is critical that a determination is made by the purchasing company to determine whether the products or solutions offered by the target company meet the business needs and fit into the business strategy of the acquiring company. This determination also includes identifying the investment needed to bring those products up to par with comparable products. As a result, the acquisition costs involved in purchasing a company with its software product or products is a great concern. Much effort goes into determining what costs are present. Some of these acquisition costs include, for example, the investment of time and/or money needed to modify the product to sale in other markets. For example, a software product coded using Unicode is easier to modify for use in markets with different languages than products coded using a proprietary code. Another acquisition cost involves legal exposure for the software product that is being evaluated for acquisition. These and other factors are currently identified using due diligence teams that conduct interviews to determine the architectural and technical capabilities of the software product.

Understandably, these team members cannot be subject matter experts in all aspects of software design and development. As a result, a superficial analysis is made or the team is expanded to include subject matter experts. Both choices have drawbacks. To date, superficial analysis has cost companies many millions of dollars of unplanned yet required development costs. For example, un-translated software products from acquired companies need to be translated into many languages to be useable along side other software products for companies with a global market. Often times, reluctance is present to involve too many people in private discussions and a reluctance also is present to exclude subject matter experts from examining proprietary code and architectures of the software products.

Therefore, it would be advantageous to have an improved method, apparatus, and computer instructions for evaluating the acquisition costs for a software product.

SUMMARY OF THE INVENTION

The present invention provides an improved method, apparatus, and computer instructions for evaluating acquisition costs for a software product. A set of questions regarding the software product is presented. The set of questions are selected from a source. Costs for acquiring the software product are identified in response to receiving a user input to the set of questions. A report is generated using the costs, wherein the report is used to evaluate whether to acquire the software product in response to identifying the costs.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 8 is a diagram of additional questions used in assessing the cost of acquiring a software products in accordance with a preferred embodiment of the present invention.

DETAILED DESCRIPTION OF THE PREFERRED EMBODIMENT

Figure 1:
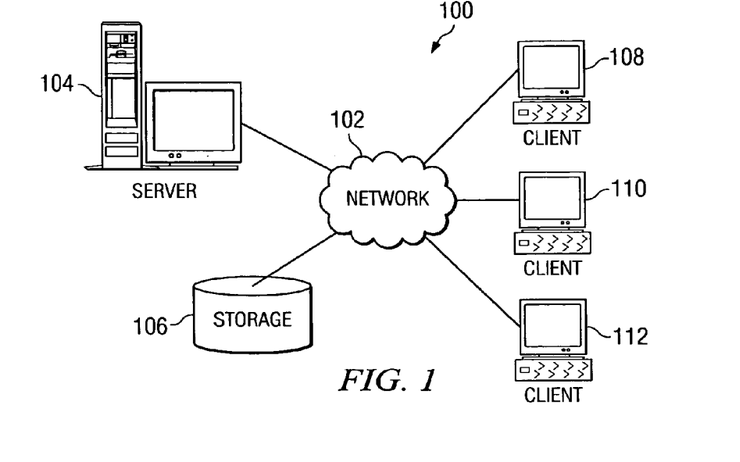
FIG. 1 is a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
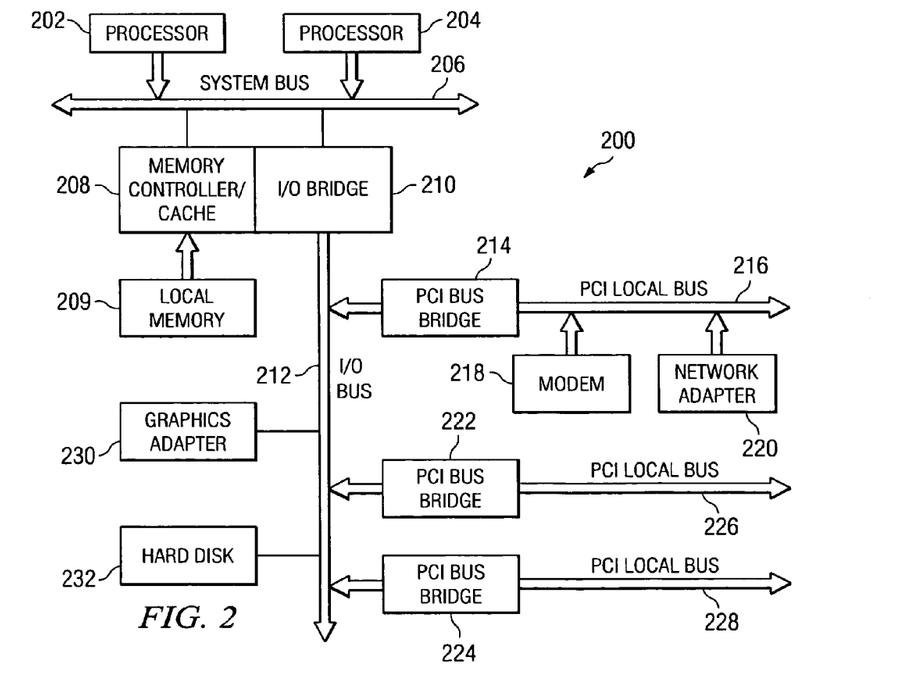
FIG. 2 is a block diagram of a data processing system that may be implemented as a server in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O Bus Bridge 210 is connected to system bus 206 and provides an interface to I/O bus 212. Memory controller/cache 208 and I/O Bus Bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in connectors.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, N.Y., running the Advanced Interactive Executive (AIX) operating system or LINUX operating system.

Figure 3:
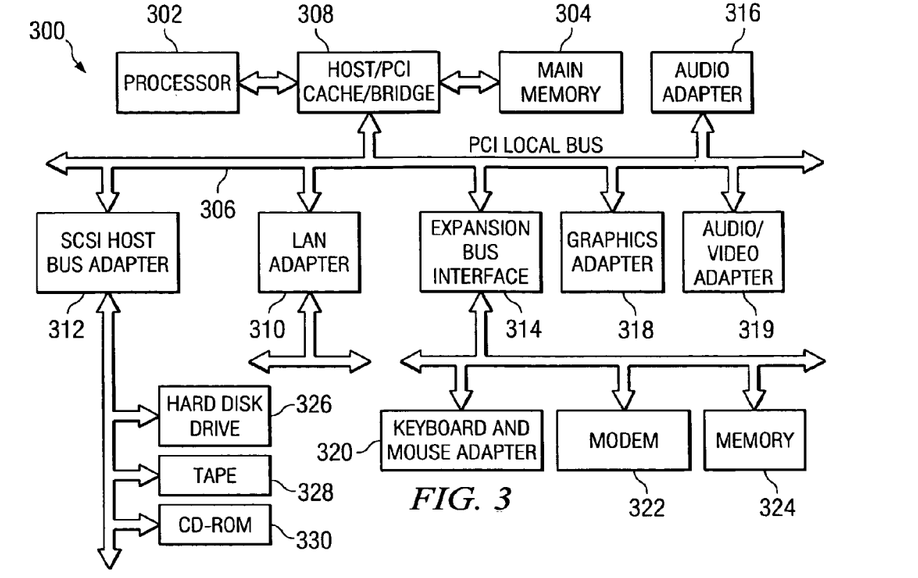
FIG. 3 is a block diagram illustrating a data processing system in which the present invention may be implemented.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI Bridge 308. PCI Bridge 308 also may include an integrated memory controller and cache memory for processor 302. Additional connections to PCI local bus 306 may be made through direct component interconnection or through add-in boards. In the depicted example, local area network (LAN) adapter 310, small computer system interface (SCSI) host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. SCSI host bus adapter 312 provides a connection for hard disk drive 326, tape drive 328, and CD-ROM drive 330. Typical PCI local bus implementations will support three or four PC expansion slots or add-in connectors.

An operating system runs on processor 302 and is used to coordinate and provide control of various components within data processing system 300 in FIG. 3. The operating system may be a commercially available operating system, such as Windows XP, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented programming system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interfaces As a further example, data processing system 300 may be a personal digital assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

The present invention provides a method, apparatus and computer instructions for analyzing software products that are the target of a potential acquisition. These software products may be acquired by themselves or along with a company. The mechanism of the present invention employs a database driven by a front-end wizard that allows a consistent set of questions to be asked regarding a software product. The answers to these questions may be used to answer various technical questions regarding the software product. In this manner, acquisition costs for a software product may be identified. In these illustrative examples, the acquisition costs include costs, such as legal exposure, time and effort needed to modify the product for selected markets, and time and effort need to modify the product for use with other software products.

Figure 4:
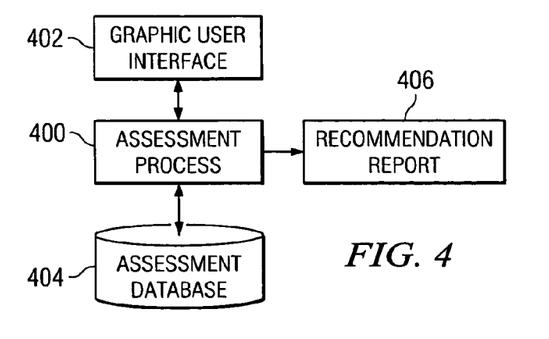
FIG. 4 is a diagram of components used for accessing acquisition costs in accordance with a preferred embodiment of the present invention.

Turning now to FIG. 4, a diagram of components used for accessing acquisition costs is depicted in accordance with a preferred embodiment of the present invention. In this example, assessment process 400 contains the processes for a software expert or wizard for identifying cost associated with acquiring a software product. A wizard is a program that provides instructional help in an application or system development environment that guides the user through a series of question-and-answer steps to accomplish a task. As used in the illustrative examples, a software wizard is employed to ask questions in a manner necessary to identify technical aspects of a software product. These questions are not necessarily technical questions about the coding of the software product. Instead, these questions are ones that may be used to infer a type of architecture or coding used in the software product. For example, if an interest is present for an ability to globally use a software product that is coded only for a single language, questions such as whether the software product supports Unicode may be asked to identify costs that may be needed to globalize the software product.

Graphical user interface (GUI) 402 provides an interface for assessment process 400 to present questions and receive user input. These questions are identified using assessment database 404 in this illustrative example. For example, in the area of software globalization, high level questions may be asked about what markets the company currently does business in, whether they currently do business in other countries, or whether they translate. These high level questions prompt related lower-level, follow-up questions. After all of the questions have been presented by assessment process 400, this process generates recommendation report 406. This report may merely include answers to the questions for review by a subject matter expert. This report details the different costs identified or inferred from answers to questions presented regarding the software product. With this report, a consistent analysis may be made regarding the acquisition cost for software products.

Alternatively, assessment process 400 also may include processes for an expert system to generate conclusions or inferences about the cost for acquiring the software product. An expert system is an artificial intelligence application that uses a knowledge base of human expertise for problem solving. This type of system derives its answers by running the knowledge base through an inference engine, which is software that interacts with the user and processes the results from the rules and data in the knowledge base.

Figure 5:
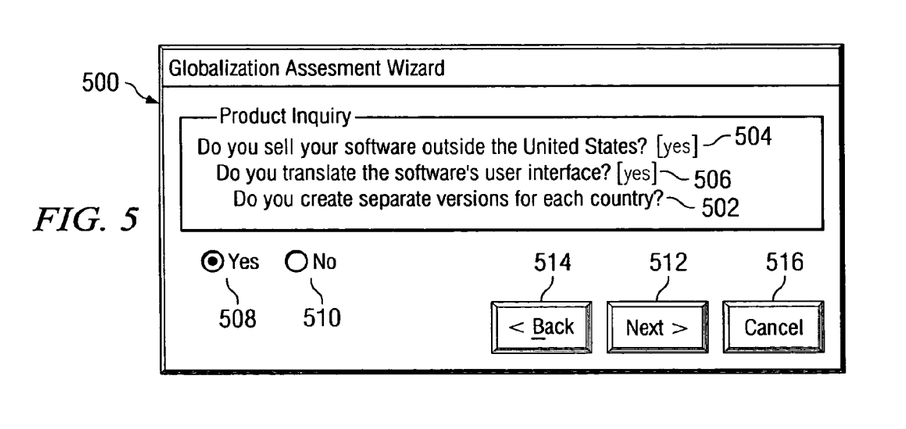
FIG. 5 is a diagram illustrating a graphical user interface for an assessment system in accordance with a preferred embodiment of the present invention.

Turning next to FIG. 5, a diagram illustrating a graphical user interface for an assessment system is depicted in accordance with a preferred embodiment of the present invention. Window 500 displays questions regarding a product inquiry. Question 502 is present in response to yes answers to questions 504 and 506. A user answers the question by selecting "yes" field 508 or "no" field 510 in this example. Other types of fields such as text fields may be used to allow a user to input answers.

A user may precede to the next question after answering the present question by selecting next button 512. The user may return to a previous question by selecting back button 514. The entire process may be ended by selecting cancel button 516. The particular questions presented are based on answers to prior questions.

Figure 6:
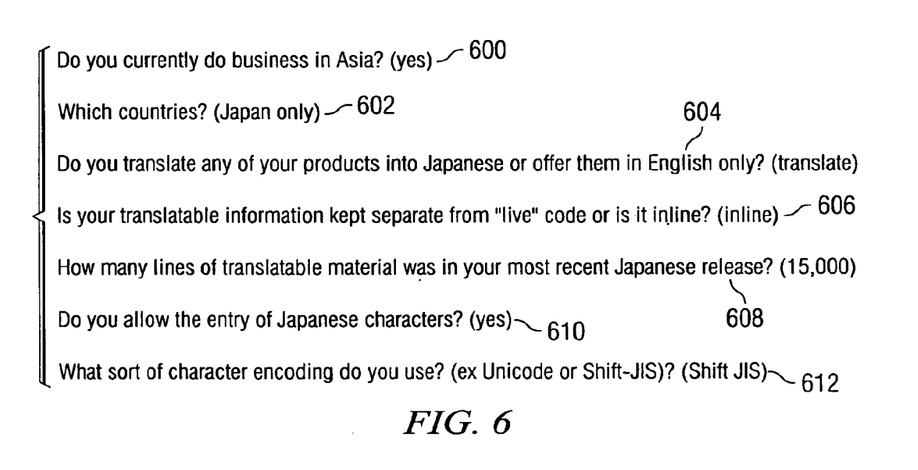
FIG. 6 is a diagram illustrating a series of questions and answers for software product assessment in accordance with a preferred embodiment of the present invention.

Turning next to FIG. 6, a diagram illustrating a series of questions and answers for software product assessment is depicted in accordance with a preferred embodiment of the present invention. In this illustrative example, in response to a yes answer to question 600, question 602 is presented. If Japan is the only identified country in which the company does business, question 604 is presented. If products are translated in response to this question, question 606 is asked. In response to a user input that the translatable information is inline with the code, question 608 is presented. Question 610 is presented after an answer to question 608 is entered by the user. Additionally, question 612 is presented in response to an answer in which the entry of Japanese characters is allowed.

The answers to these questions may be placed into a report by the assessment process. This report may be reviewed by a subject matter expert to conclude that the company will eventually have to translate into 3 additional Asian languages: Korean, Simplified Chinese and Traditional Chinese. This translation will be expensive and eventually the code will have to be modified/redesigned to separate translatable data. Costs per line can be estimated for the missing languages. The program was designed specifically for the Japanese market and must be redesigned for a global market using Unicode. The mechanism of the present invention also may use an expert system to generate these conclusions such that the report may be reviewed by someone who is not a subject matter expert.

Figure 7:
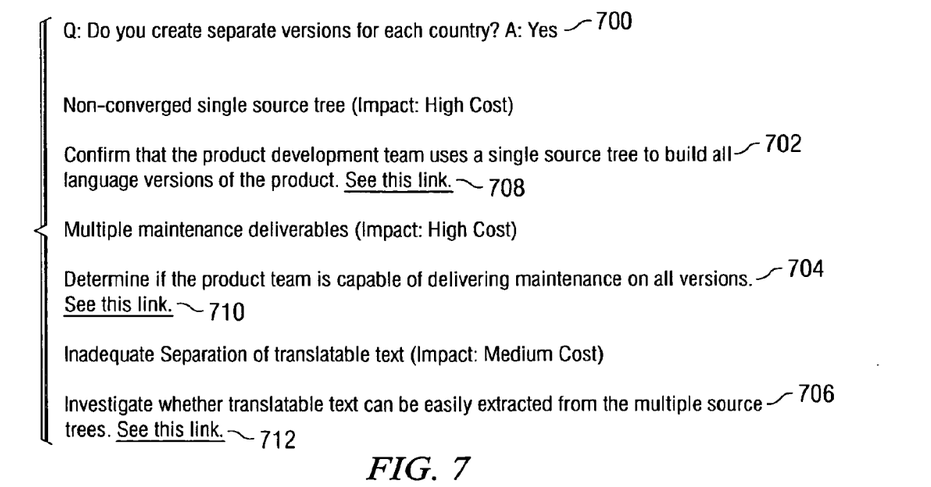
FIG. 7 is a diagram of questions in accordance with a preferred embodiment of the present invention.

With reference to FIG. 7, a diagram of questions is depicted in accordance with a preferred embodiment of the present invention. A "yes" answer to question 700 results in additional areas for questioning as illustrated in lines 702, 704, and 706. These areas of questioning are reached though links 708, 710, and 712.

In FIG. 8, a diagram of additional questions used in assessing the cost of acquiring a software product is depicted in accordance with a preferred embodiment of the present invention. In this example, questions in sections 800, 802, 804, 806, 808, 810, 812, and 814 are used to identify costs that may be incurred in globalizing a software product. These questions are merely examples of the different types of questions that may be asked by an assessment process in identifying acquisition costs for a software product.

Other areas and types of questions may be presented based on the particular costs that are of interest. For example, different questions are asked regarding legal exposure and for conforming to different standards. As an example of standards that may be required, the Chinese government as introduced a new character encoding standard called GB18030. Software manufacturers must support this standard if they intend to sell or manufacture software in Mainland China. If a software vendor fails to comply with the standard, the vendor is subject to fines and may be possibly forced to remove their products from the marketplace.

Figure 9:
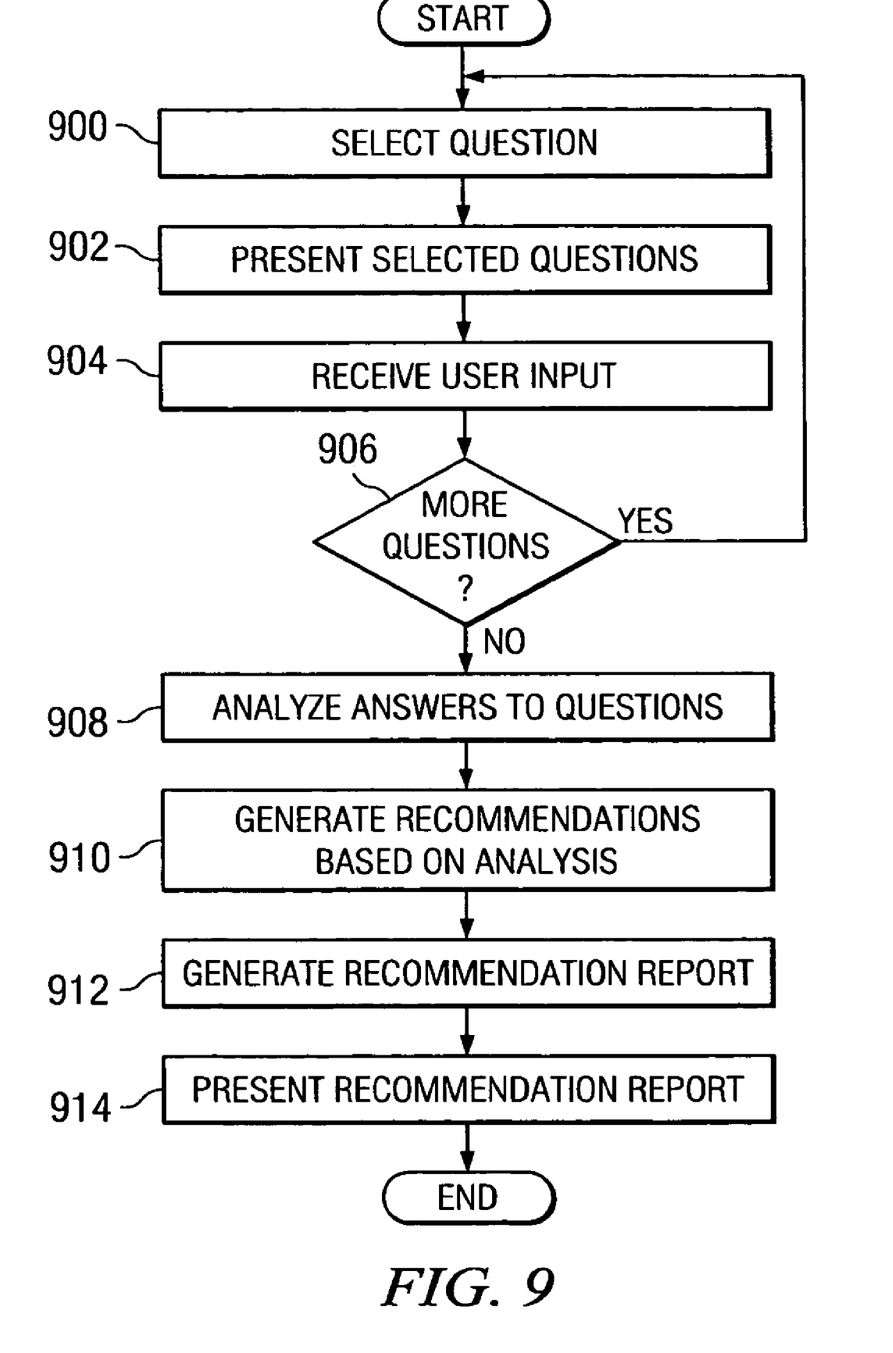
FIG. 9 is a flowchart of a process for generating recommendation reports in accordance with a preferred embodiment of the present invention.

Turning now to FIG. 9, a flowchart of a process for generating recommendation reports is depicted in accordance with a preferred embodiment of the present invention. The process illustrated in FIG. 9 may be implemented in an assessment process, such as assessment process 400 in FIG. 4.

The process begins by selecting a question for a user (step 900). This question is selected from a database, such as assessment database 404 in FIG. 4. This database contains questions and answers for identifying costs for the software product being evaluated. The selected question is presented to the user (step 902). In these examples, the question is presented through a graphical user interface, such as graphical user interface 402 in FIG. 4. User input is received for the selected question (step 904). A determination is made as to whether more questions are to be selected and presented (step 906). This determination is made based on the number of questions remaining to be asked and the user's answer to the question. For example, the user input may require an additional question or more detailed questions to be selected and presented for the user to enter answers. Alternatively, another question may be selected for presentation from a series of questions for the software application being evaluated for acquisition. If more questions are not present, the answers to questions presented to the user are analyzed (step 908).

Next, recommendations based on analysis are generated (step 910). This analysis is performed using an expert system that includes rules for inferring costs based on the answers to the questions presented. A recommendation report is generated (step 912), and the report is presented (step 914) with the process terminating thereafter.

Turning back now to step 906, if a determination is made that more questions are present, the process returns to step 900 to select another question for the user.

Thus, the present invention provides an improved method, apparatus, and computer instructions for assessing the costs involved with acquiring a software product. The mechanism of the present invention allows for the assessment to be made without requiring subject matter experts to be involved in the evaluation.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The illustrated examples retrieve questions from a database. Other sources for the questions maybe used in additional to or in place of a database. For example, an extensible markup language file may be used. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system, which includes a processor, for evaluating acquisition costs for a software product, the method comprising:

selecting a set of questions, wherein the questions that are selected are questions that can be used to infer a type of coding used in the software product, and further wherein the type of coding can be used to determine whether the software product was coded for only a single spoken language;

including a question about whether the software product supports Unicode in the set of questions;

presenting a first one of the set of questions regarding the software product, wherein the first one of the set of questions is selected from a source, wherein the presenting step is performed using a graphical user interface, wherein the source is at least one of a database, and an extensible markup language file;

responsive to a particular user input to the first one of the set of questions, selecting by a routine that is being executed by the processor, a second one of the set of questions from the source using the particular user input;

responsive to receiving a particular user input to the second one of the set of questions, determining, by the routine that is being executed by the processor, whether the software product was coded for only a single spoken language;

determining, by the routine that is being executed by the processor, whether the software product needs to be translated into a plurality of different spoken languages;

responsive to both determining that the software product was coded for only the single spoken language and to determining that the software product needs to be translated into each one of the plurality of different spoken languages, identifying acquisition costs, by the routine that is being executed by the processor, for acquiring the software product including estimating a cost per line of the software product for translating the software product into each one of the plurality of spoken languages, and further wherein the costs are identified using an expert system, and still further wherein the acquisition costs include legal exposure for the software product and investment needed to modify the software product to meet a selected standard, and;

responsive to identifying the costs, generating a report using the costs, wherein the report is used to evaluate whether to acquire the software product.

* * * * *